3,117,074
METHOD OF SEPARATING SLUDGE FROM LIQUID HYDROCRACKED PRODUCTS
Donald L. Honerkamp, Hazel Crest, and Barney Vallino, Jr., Chicago, Ill., assignors, by mesne assignments, to Sinclair Research, Inc., New York, N.Y., a corporation of Delaware
Filed Oct. 6, 1958, Ser. No. 765,539
4 Claims. (Cl. 208—95)

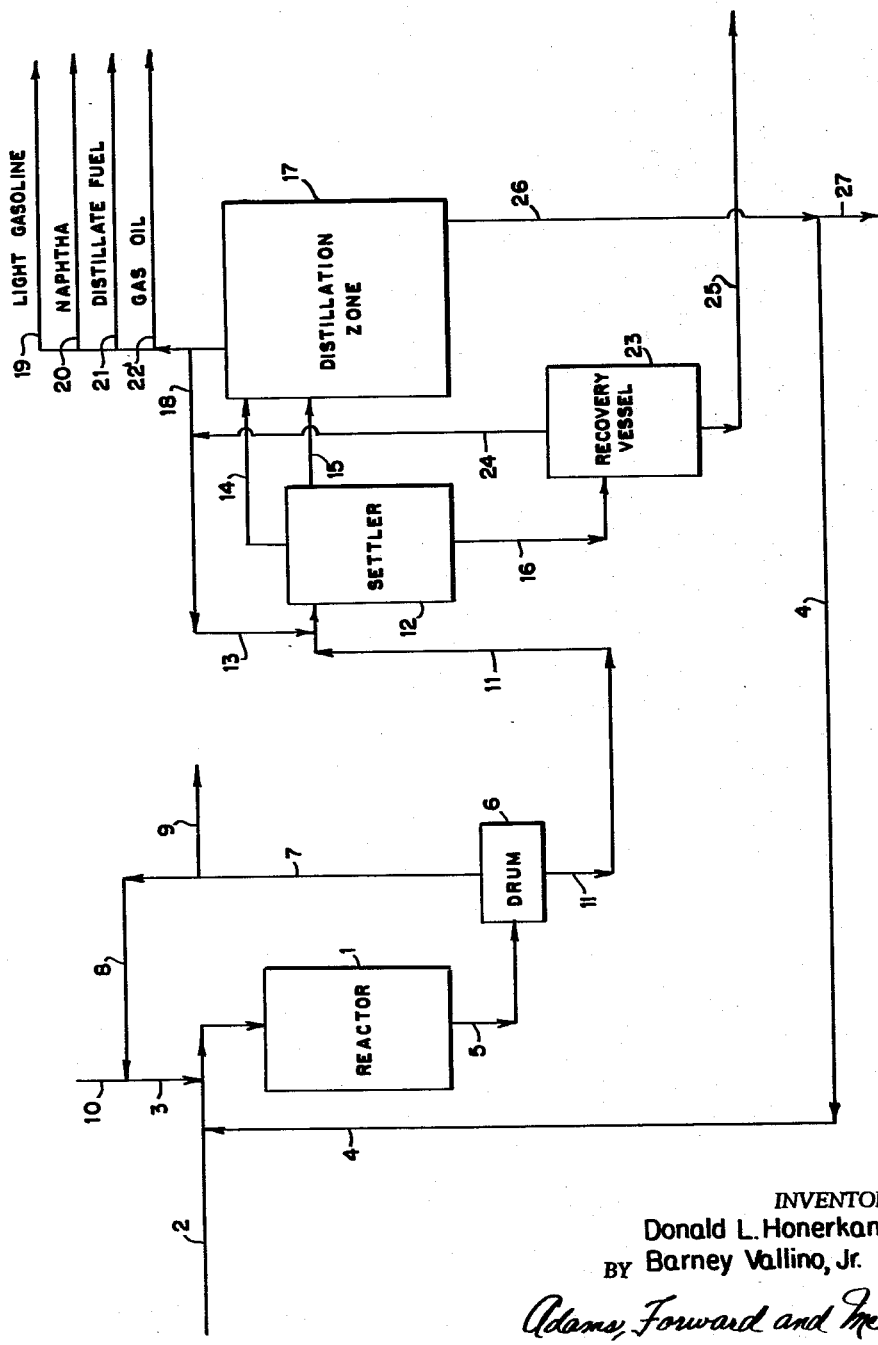

Our invention relates to an improvement in the hydrocracking of asphalt-containing petroleum residual fractions to produce lower boiling materials such as gasoline and the like.

It has heretofore been proposed to hydrocrack asphalt-containing petroleum residual fractions by passing such fractions together with hydrogen into contact with a hydrogenation catalyst under elevated conditions of temperature and pressure to produce gasoline and the like. In hydrocracking, it is desirable to operate at relatively mild conditions of pressure, in order to reduce capital and operating costs, and it is also desirable to recycle the residual portion of the hydrocracked product, in order to produce as much gasoline and the like from a given quantity of fresh feed. In hydrocracking asphalt-containing petroleum residual fractions under relatively mild conditions of pressure and with recycling, it is found, however, that undue fouling and plugging of the reaction system takes place.

In accordance with our invention, we have discovered that the liquid hydrocracked product can be conveniently separated into two fractions, the first of which is a desirable feed to the hydrocracking zone in that it is of low tendency to cause fouling and plugging, and the second of which is a sludge and is an undesirable feed to the hydrocracking zone, having a high tendency to cause fouling and plugging in comparison with the hydrocracked product from which it is derived. This separation can be accomplished in a variety of ways, as by simple settling.

Hence, our invention is an improved process for hydrocracking asphalt-containing petroleum residual fractions in which such a fraction is hydrocracked by passing it under hydrocracking conditions of temperature and pressure and in admixture with hydrogen into contact with a hydrocracking catalyst. The feed to our process can be, for example, a residue resulting from the distillation of crude petroleum. On the other hand, we can employ asphaltic materials which are precipitated in the propane treatment of a crude residue containing asphalt.

Any of the catalysts conventionally employed in the hydrocracking of heavy petroleum oils can be utilized in accordance with the present process. Examples of suitable catalytic ingredients are molybdenum, tungsten, vanadium, chromium, cobalt, nickel, iron and tin and their oxides and sufides. Mixtures of these materials or compounds or two or more of the oxides can be employed. For example, mixtures or compounds of the iron group metal oxides or sulfides with the oxides or sulfides of group VI left column of the periodic table constitute very satisfactory catalysts. Examples of such mixtures or compounds are nickel molybdate, tungstate or chromate (or thiomolybdate, thiotungstate or thiochromate) or mixtures of nickel oxide with molybdenum, tungsten or chromium oxides.

These catalytic ingredients can be disposed on or carried by known cracking catalysts of the solid refractory type. Suitable catalysts of this type are silicates or mixtures of silicates or mixtures of oxides which are known to be cracking catalysts. Snythetic cracking catalysts of this type will generally be mixtures of hydrous oxides of silicon with one or more of the oxides of magnesium, boron, aluminum, titanium or zirconium. Natural cracking catalysts of this type are usually silicates of magnesium and/or aluminum combined with minor amounts of oxides of these metals which may or may not be activated as by acid treatment. Specifiic examples of suitable solid refractory cracking catalysts are natural or synthetic fluoride-promoted alumina, silica-alumina, silica-magnesia, zirconia-silica, titania-silica, alumina-zirconia-silica, alumina-boria-silica or alumina-magnesia-silica cracking catalysts. The catalytic ingredients can be dispersed on or composited with the base in any conventional manner, for example by impregnating it with a suitable solution of a salt followed by drying and calcining to convert the salt to the oxide.

The hydrocracking step of the process of our invention is carried out under relatively mild pressure conditions generally from 750 p.s.i.g. to 1200 p.s.i.g. The temperature used in the hydrocracking zone will generally be from 750° F. to 850° F. and preferably from 800° F. to 840° F. The hydrocracking is carried out with hydrogen being introduced into the hydrocracking zone, and the amount of hydrogen introduced is generally within the range from 3,000 to 10,000 standard cubic feet per barrel of fresh feed. Also, the amount of hydrogen consumed in the hydrocracking step of our invention is generally within the range from 300 to 2,000 standard cubic feet per barrel of fresh feed. The weight hourly space velocity (WHSV, weight units of oil introduced into the reaction zone per weight unit of catalyst per hour) will generally be within the weight range from 0.3 to 3.0, based upon the amount of the fresh feed.

From the liquid hydrocracked product there is separated a first fraction which is a desirable feed to the hydrocracking zone and this fraction, or a portion thereof, is recycled, generally in amounts such that the weight of the material in the first fraction boiling at 950° F. and above is from one-half to one times the weight of the fresh feed. Also, from the liquid hydrocracked product there is separated a second fraction which is a sludge and which is an undesirable feed to the hydrocracking zone, in comparison with the mixture from which it is derived. This second fraction is not recycled to the hydrocracking zone. The separation can be effected, if desired, by simple mechanical separation, for example, hot filtration, centrifuging or settling. Also, prior to or during mechanical separation there can be added to the liquid hydrocracked product a small amount of a flocculating agent, such as boron trifluoride-ether complex, to aid in the formation of sludge. In addition, prior to or during mechanical separation a small amount of a light hydrocrabon liquid can be added to the liquid hydrocracked product to aid in the formation of sludge. Using the aforementioned techniques, the sludge can be separated from full range liquid hydrocracked product or from a residual fraction thereof, for example, material boiling above the gasoline range, or above the gas oil range. The separation of the sludge can be carried out under a wide range of temperature conditions, generally from about 75° F. to 500° F., the particular temperature chosen in practice depending in part upon the viscosity of the liquid hydrocracked product from which the sludge is being separated.

In accordance with our invention, we have found that particular advantage is derived in the embodiment thereof wherein the sludge is formed by a combination of settling and the addition of boron trifluoride-ether complex to the liquid hydrocracked product. Thus, when this particular sludge-forming technique is used, the amount of sludge formed is increased and the remainder of the hydrocracked product is of lower asphaltene and metal content. Tables I and II set forth the results obtained in hydrocracking a sample of asphalt feed in two runs using a cobalt oxide-molybdenumoxide-alumina catalyst. In Table I the following hydrocracking conditions were used: temperature, 816° F.; pressure, 950 p.s.i.g.; hydrogen feed rate, 5,940 standard cubic feet per barrel of fresh feed; hydrogen consumption, 525 standard cubic feet per barrel of fresh feed; and weight hourly space velocity, 0.99. In Table II, the following hydrocracking conditions were used: temperature, 822° F; pressure, 955 p.s.i.g.; hydrogen feed rate, 7,000 standard cubic feet per barrel of fresh feed; hydrogen consumption, 700 standard cubic feet per barrel of fresh feed; and weight hourly space velocity, 0.74.

TABLE I

| Stock | Yields (Wt. Percent) | ° API | Percent C | Percent H | Percent S | n-$C_5$ insol. (Wt. Percent) | NiO (p.p.m.) | $V_2O_5$ (p.p.m.) |
|---|---|---|---|---|---|---|---|---|
| 400° F.+ Hydrocracked Product Settling at 250° F. with 1% $BF_3$-Ether Complex Added: | 100 | 12.7 | 86.77 | 10.89 | 1.09 | 16.5 | 88 | 200 |
| Decanted Material | 83 | 14.1 | 87.05 | 11.19 | 0.90 | 12.8 | 60 | 130 |
| Sludge | 17 | | | | | | | |
| Asphalt Feed | | 9.7 | 86.30 | 10.74 | 1.28 | 13.7 | 100 | 100 |

TABLE II

| Stock | Yields (Wt. Percent) | ° API | Percent C | Percent H | Percent S | n-$C_5$ insol. (Wt. Percent) | NiO (p.p.m.) | $V_2O_5$ (p.p.m.) |
|---|---|---|---|---|---|---|---|---|
| 950° F.+ Hydrocracked Product Settling at 250° F. with 1% $BF_3$-Ether Complex Added: | 100 | 4.9 | 87.20 | 10.06 | 1.35 | 26.3 | 138 | 370 |
| Decanted Material | 77 | 6.5 | 87.41 | 10.46 | 1.39 | 24.1 | 98 | 240 |
| Sludge | 23 | | | | | | 215 | 620 |
| Asphalt Feed | | 9.7 | 86.30 | 10.74 | 1.28 | 13.7 | 100 | 300 |

The following example illustrates the invention and is to be considered together with the accompanying drawing, which shows an arrangement of apparatus in which our invention can be carried out.

Example

Asphalt feed at the rate of 1000 barrels per day, hydrogen gas at the rate of 6000 standard cubic feet per barrel of asphalt feed and recycle bottoms at the rate of 800 barrels per day are introduced into hydrocracking reactor 1 by means of lines 2, 3 and 4, respectively. Reactor 1 is provided with a bed of supported cobalt molybdate catalyst pellets analyzing 2.62 weight percent cobalt, 9.65 weight percent $MoO_3$, 80.89 weight percent alumina and 5.5 weight percent silica. The amount of catalyst present in reactor 1 is such that the weight hourly space velocity is 0.5, based upon fresh asphalt feed. The temperature in reactor 1 is 815° F. and the pressure is 1000 p.s.i.g. By operating in this manner, hydrogen consumption is approximately 1000 standard cubic feet per barrel of fresh asphalt feed.

Hydrocracked product, together with unconsumed hydrogen, is removed from the bottom of reactor 1 by means of line 5 and is introduced into flash drum 6, which is maintained at a temperature of approximately 200° F. by cooling means not shown and which is operated at substantially the same pressure as reactor 1. Unconsumed hydrogen as well as certain volatile constituents of the hydrocracked product, such as $C_1$ to $C_3$ hydrocarbons, hydrogen sulfide, ammonia and water, are removed overhead from flash drum 6 by means of line 7 and recycled by means of lines 8 and 3 to reactor 1. In order to prevent excessive build-up of volatile constitutents of the hydrocracked product in the hydrocracking zone, release gas line 9 is provided. Make-up hydrogen is introduced through line 10, as needed.

Liquid hydrocracked product is removed from flash drum 6 by means of line 11 at the rate of 1840 barrels per day and this is introduced into settler 12 together with 1 percent by weight of boron tri-fluoride-ether complex based upon the weight of the liquid passing through line 11, the boron trifluoride-ether complex being introduced by means of line 13. Settler 12 is operated in such manner that three phases are present therein, namely, an upper vapor phase which is removed by means of line 14, an intermediate layer of liquid hydrocracked products from which sludge has been separated which is removed by means of line 15, and a lower sludge layer which is removed by means of line 16.

The vapors passing through line 14 and the sludge-free liquid hydrocracked product passing through line 15 are introduced into distillation zone 17, which is composed of a series of fractionating columns including a vacuum still. As separate overhead products from distillation zone 17, there are recovered boron fluoride-ether complex, light gasoline, naphtha, distillate fuel, and gas oil, through lines 18, 19, 20, 21 and 22, respectively.

The sludge passing through line 16 is introduced into boron trifluoride-ether complex recovery vessel 23, which is heated so as to maintain it at a temperature of 300° F. Boron trifluoride-ether complex pass overhead from vessel 23 through line 24, is admixed with similar material passing through line 18, and is then introduced into settler 12 using line 13. From the bottom of vessel 23 through line 25 there is removed 120 barrels per day of sludge which is useful as fuel.

Bottoms are removed from the vacuum still which forms a part of distillation zone 17 using line 26. Of these bottoms 800 barrels a day pass through line 4 and excess is removed by means of line 27.

Table III sets forth information concerning the asphalt feed and the products produced when the operation of the example is carried out.

TABLE III

| Identity | Asphalt Feed | Products | | | | Btms. Yd. or Recycle | Sludge | |
|---|---|---|---|---|---|---|---|---|
| | | Gasoline | Naphtha | Distillate | Gas Oil | | Solid Portion | Liquid Portion |
| Specific Gravity 60/60 | 1.0021 | | | | | | 1.25 | |
| °API | 9.7 | 68.7 | 53.2 | 34.33 | 22.5 | 6.5 | | 6.5 |
| Penetration at 77° F | 265 | | | | | | | |
| R. & B. Soft. Pt., °F | 101 | | | | | | | |
| Viscosity; | | | | | | | | |
| Kv 100° F | | | | | 2.956 | | | |
| SUS/122° F | | | | | | 178.7 | | |
| SFS/210° F | 610 | | | | | | | |
| Con. Carbon Res., Wt., percent | 19.33 | | | | | 0.27 | | |
| $C_5$ Insol., Wt., percent | 13.62 | | | | | | 24.1 | 38.85 | 24.1 |
| Viscosity, SUS/210° F | | | | | | 141.5 | | |
| Carbon, Wt., percent | 86.30 | | | | | 87.41 | 87.00 | 87.41 |
| Hydrogen, Wt. percent | 10.74 | | | | | 10.46 | 8.54 | 10.46 |
| Sulfur, Wt., percent | 1.28 | 0.27 | 0.37 | 0.60 | 0.81 | 1.39 | 1.42 | 1.39 |
| NiO, p.p.m. | 100 | | | | | 0.39 | 112 | 270 | 112 |
| $V_2O_5$, p.p.m. | 300 | | | | | 0.72 | 280 | 520 | 280 |
| Bromine No | | 9.5 | 24.4 | 26.3 | | | | |
| Octane; | | | | | | | | |
| RM | | 68.6 | 58.4 | | | | | |
| RM + 3 cc. TEL | | 73.5 | 52.0 | | | | | |
| Cetane No | | | | 45.9 | | | | |

It is claimed:

1. In the hydrocracking of a petroleum residual fraction containing asphalt to produce lower boiling materials by passing the residual fraction and hydrogen into contact with a solid hydrocracking catalyst under hydrocracking conditions of temperature and pressure, the steps of introducing boron trifluoride-ether complex into the residual fraction of the liquid hydrocracked product, separating sludge from said residual fraction and returning to the hydrocracking zone together with fresh feed hydrocracked product from which the sludge has been separated and lower boiling materials removed, the hydrocracking being conducted under the following conditions: temperature, 750 to 850° F.; pressure, 750 to 1200 p.s.i.g.; weight hourly space velocity based on fresh feed, 0.3 to 3.0; hydrogen rate based on fresh feed, 3000 to 10,000 standard cubic feet per barrel; and hydrogen consumption rate based on fresh feed, 300 to 2000 standard cubic feet per barrel.

2. The process of claim 1 wherein the hydrocracking catalyst is cobalt molybdate supported on alumina.

3. In the hydrocracking of a petroleum residual fraction containing asphalt by passing the residual fraction and hydrogen into contact with a solid cobalt molybdate on alumina hydrocracking catalyst under hydrocracking conditions of temperature and pressure to produce lower boiling materials, the steps of introducing boron trifluoride-ester complex into the liquid hydrocracked product, distilling the hydrocracked product from which sludge has been separated to remove overhead lower boiling materials and returning bottoms to the hydrocracking zone together with fresh feed, the hydrocracking being conducted under the following conditions: temperature, 750 to 850° F.; pressure, 750 to 1200 p.s.i.g.; weight hourly space velocity based on fresh feed, 0.3 to 3.0; hydrogen rate based on fresh feed, 3,000 to 10,000 standard cubic feet per barrel; and hydrogen consumption rate based on fresh feed, 300 to 2,000 standard cubic feet per barrel.

4. The process of claim 3 in which the bottoms are returned to the hydrocracking zone together with fresh feed in an amount such that the weight of material in said product boiling at 950° F. and above is from one-half to one times the weight of the fresh feed.

References Cited in the file of this patent

UNITED STATES PATENTS

| | | |
|---|---|---|
| 2,495,852 | Lien et al. | Jan. 31, 1950 |
| 2,619,450 | Fleming | Nov. 25, 1952 |
| 2,657,175 | Mason | Oct. 27, 1953 |
| 2,768,936 | Anderson et al. | Oct. 30, 1956 |

UNITED STATES PATENT OFFICE
CERTIFICATE OF CORRECTION

Patent No. 3,117,074                      January 7, 1964

Donald L. Hoperkamp et al.

It is hereby certified that error appears in the above numbered patent requiring correction and that the said Letters Patent should read as corrected below.

Column 5, line 25, after "product," insert -- separating sludge from said liquid hydrocracked product, --.

Signed and sealed this 10th day of November 1964.

(SEAL)
Attest:

ERNEST W. SWIDER                         EDWARD J. BRENNER
Attesting Officer                           Commissioner of Patents